(12) United States Patent
Martinez et al.

(10) Patent No.: US 7,831,619 B2
(45) Date of Patent: Nov. 9, 2010

(54) METHOD OF AND SYSTEM FOR MAXIMIZING THE RETURN RATE OF DYNAMIC INQUIRIES INTO A POPULATION

(75) Inventors: Anthony E. Martinez, Augustine, FL (US); Ronald J. Salpietra, Huntersville, NC (US); Stella L. Taylor, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 11/755,554

(22) Filed: May 30, 2007

(65) Prior Publication Data

US 2008/0301145 A1    Dec. 4, 2008

(51) Int. Cl.
*G06F 17/30* (2006.01)
(52) U.S. Cl. ...................................... 707/784
(58) Field of Classification Search ................. 707/784
See application file for complete search history.

(56) References Cited

U.S. PATENT DOCUMENTS

| 6,250,930 | B1 | 6/2001 | Mintz |
| 6,501,950 | B1* | 12/2002 | Smith et al. ............. 455/423 |
| 6,513,013 | B1 | 1/2003 | Stephanou |
| 6,616,458 | B1 | 9/2003 | Walker et al. |
| 7,184,968 | B2 | 2/2007 | Shapiro et al. |
| 2002/0099942 | A1* | 7/2002 | Gohl ......................... 713/169 |
| 2003/0061141 | A1 | 3/2003 | D'Alessandro |
| 2003/0061512 | A1 | 3/2003 | Flurry et al. |
| 2003/0200137 | A1 | 10/2003 | Drummond |
| 2006/0041756 | A1* | 2/2006 | Ashok et al. ............... 713/183 |

FOREIGN PATENT DOCUMENTS

| JP | 2002-536529 | 10/2002 |
| JP | 2005-534993 | 11/2005 |
| JP | 2007-163894 | 1/2009 |
| JP | 2007-264480 | 4/2009 |

OTHER PUBLICATIONS

Office Action for Japanese Application No. 2006-162992 dated Jan. 19, 2010.

* cited by examiner

*Primary Examiner*—James Trujillo
*Assistant Examiner*—William Spieler
(74) *Attorney, Agent, or Firm*—Dillon & Yudell LLP (57) ABSTRACT

A method of and system for submitting inquiries to members of an organization determine if there is a pending inquiry to be submitted to the member. If there is a pending inquiry to be submitted to the member, the system displays the pending inquiry to the member. The system permits the member to logon to said server if the member responds to said inquiry. The system may allow the member to defer responding to the inquiry and permit the member to logon to the server without responding to the inquiry. If deferral of response to the inquiry is not allowed, the system will deny the member access to the server if the member fails to respond to said inquiry.

17 Claims, 9 Drawing Sheets

FIG. 1

| 201 | 203 | 205 | 207 | 209 | 211 | 213 |
|---|---|---|---|---|---|---|
| INQUIRY NUMBER | TITLE OF INQUIRY | TARGET OF INQUIRY | TIMEFRAME | NUMBER OF QUESTIONS | QUESTIONS | RESPONSE TYPE |

| 301 | 303 |
|---|---|
| USERID | PENDING INQUIRIES |
| USER_A | 1234; 1235; 1350; 1365; 1458; 1501; 1515 |
| USER_B | NONE |
| USER_C | 1350; 1365; 1458; 1501; 1515 |
| USER_D | 1515 |
| USER_E | 1234; 1235; 1333; 1350; 1365; 1458; 1501; 1515 |
| USER_F | 1234; 1333; 1365; 1458; 1515 |
| USER_G | NONE |

| CONNECT TO APPLICATION | ? ✕ |

USER NAME: 403 ▼

PASSWORD: 405

407 ☐ REMEMBER MY PASSWORD

[ OK ]   [ CANCEL ]
 409      411

WE URGENTLY NEED YOUR RESPONSES TO THE FOLLOWING INQUIRY:

WHAT IS YOUR EXPERIENCE IN THE AEROSPACE INDUSTRY? — 413

417 — ○ NO SKILL   ○ ACQUIRED   ○ APPLIED   ○ MASTERED

WHAT IS YOUR EXPERIENCE IN LOGISITICS? — 415

○ NO SKILL   ○ ACQUIRED   ○ APPLIED   ○ MASTERED

YOUR RESPONSES WILL UPDATE YOUR PROFESSIONAL DEVELOPMENT SKILLS PROFILE. ONCE YOU ANSWER THESE QUESTIONS YOU CAN CONTINUE WITH THE LOGON PROCESS. A RESPONSE IS NEEDED BY SEPTEMBER 3, 2007.

419 — ☐ CHECK THIS BOX TO DEFER THE RESPONSE UNTIL LATER.

| CONNECT TO APPLICATION | ? ☒ |

USER NAME: [ 403 ▼ ]

PASSWORD: [ 405 ]

407 ─ ☐ REMEMBER MY PASSWORD

[ OK ]  [ CANCEL ]
  409      411

WE URGENTLY NEED YOUR RESPONSES TO THE FOLLOWING INQUIRY:

WHAT IS YOUR EXPERIENCE IN THE AEROSPACE INDUSTRY? — 413

417 ─ ◯ NO SKILL   ◯ ACQUIRED   ◯ APPLIED   ◯ MASTERED

WHAT IS YOUR EXPERIENCE IN LOGISITICS? — 415

◯ NO SKILL   ◯ ACQUIRED   ◯ APPLIED   ◯ MASTERED

YOUR RESPONSES WILL UPDATE YOUR PROFESSIONAL DEVELOPMENT SKILLS PROFILE. ONCE YOU ANSWER THESE QUESTIONS YOU CAN CONTINUE WITH THE LOGON PROCESS. RESPONSE CANNOT BE DEFERRED.

METHOD OF AND SYSTEM FOR MAXIMIZING THE RETURN RATE OF DYNAMIC INQUIRIES INTO A POPULATION

BACKGROUND OF THE INVENTION

1. Technical Field

The present invention relates generally to the field of information gathering, and more particularly to a method of and system for maximizing the return rate of dynamic inquiries into a population comprising members of an organization.

2. Description of the Related Art

Large organizations, such as corporations, governmental departments, colleges and universities, and the like, regularly ask their members, such as employees or students, to provide information so that the organization can make decisions. For example, employees are frequently asked to complete surveys with respect to their job skills and their satisfaction with management or their employment in general.

The ability to respond quickly to requests to complete surveys, skills assessments, or other data-gathering requests is often hampered by the large number of choices that must be responded to coupled with the time, or lack thereof, each individual finds available on any given day to respond to the requests. Additionally, members of an organization usually need to halt or put aside more pressing tasks in order to access an entirely different system in order to provide the information.

The foregoing shortcomings associated with current data-gathering techniques usually result in low response levels, untimely responses, and poor overall quality of data obtained. Management may have to get involved in making members of the organization respond to surveys. Management involvement usually leads to a lack of job satisfaction for both the managers and the employees.

SUMMARY OF THE INVENTION

The present invention provides a method of and system for submitting inquiries to members of an organization. Whenever a member of the organization requests to logon to a server an embodiment of the present invention determines if there is a pending inquiry to be submitted to the member. If there is a pending inquiry to be submitted to the member, the system displays the pending inquiry to the member as part of the logon process. The system permits the member to logon to said server if the member responds to said inquiry. The system may allow the member to defer responding to the inquiry and permit the member to logon to the server without responding to the inquiry. If deferral of response to the inquiry is not allowed, the system will deny the member access to the server if the member fails to respond to said inquiry.

An embodiment of the present invention includes an inquiry registry database. The inquiry registry database includes all inquiries for the organization. Some or all of the servers of the organization may have installed thereon an inquiry intercept instance that detects an attempt by a member to logon on to the server and determines from the inquiry registry database if there is a pending inquiry for the member. An inquiry intercept engine may be coupled between the inquiry intercept instance and the inquiry registry database. The inquiry intercept engine receives requests from the inquiry intercept instances and queries the inquiry registry database to provide inquiries to the inquiry intercept instances. An inquiry registry administration system adds new inquiries to the inquiry registry database. The inquiry registry administration system also maintains and prioritizes inquiries in the inquiry registry database. An inquiry response database is coupled to the inquiry intercept engine to receive response to inquiries.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
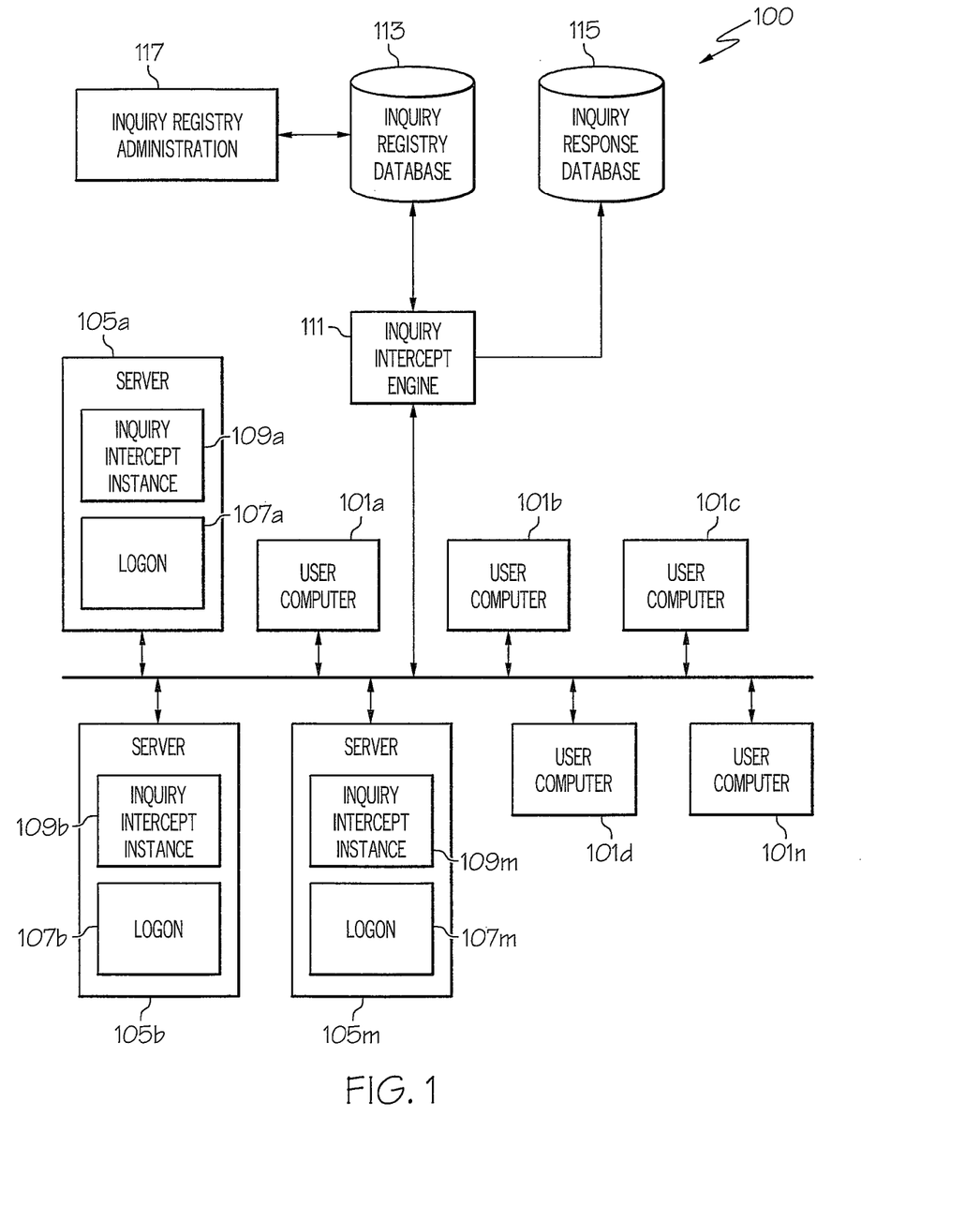
FIG. 1 is a block diagram of an embodiment of a system according to the present invention.

Referring now to the drawings and first to FIG. 1, a system according to the present invention is designated generally by the numeral 100. System 100 includes a plurality of user computers 101, including user computers 101a-101n. Each user computer 101 is coupled to a network 103. User computers 101 may personal computers, notebook computers, workstations, and the like. Each user computer 100 may be associated with a member of an organization.

System 100 includes a plurality of servers 105, including servers 105a-105m. Each server 105 is coupled to network 103. Servers 105 provide applications to client software running on user computers 101, as is well known to those skilled in the art. Servers 105 may each be implemented in a standalone computer system or they may be implemented as virtual machines running on standalone computers. Servers 105 provide most of the tools and services a member of an organization needs in order to do his or her work. Each server 105 includes logon software 107 that enables a user computer 101 to access an application running on server 105. Each server 105 also includes inquiry intercept instance software 109. According to the present invention, and as will be explained in detail hereinafter, inquiry intercept instance software 109 works with logon software 107 to provide inquiries to users attempting to logon to a server 105. Inquiries are questions that an organization routinely asks its members so that the company can make business decisions. Examples of such inquiries are skills assessments, employee satisfaction surveys, and the like. When an inquiry intercept instance 109 detects an attempt to logon to a server 105, inquiry intercept instance 109 determines if there is a pending inquiry for the user attempting to logon to the server 105. It is contemplated that an inquiry intercept instance 109 will reside on every server 105 in the organization. Thus, a member of the organization will encounter an inquiry intercept instance 109 whenever the member attempts to use any system after initial logon to network 103.

System 100 includes an inquiry intercept engine 111. Inquiry intercept engine 11 is coupled to network 103. Inquiry intercept engine 111 receives requests from inquiry intercept instances 109 to determine if there is a pending inquiry for a user attempting to logon to a server 105. Inquiry intercept engine 111 is coupled to an inquiry registry database 113. Inquiry registry database 113 contains records of pending surveys. Inquiry intercept engine 111 submits queries to inquiry registry database 113 in response to requests received from inquiry intercept instances 109. Inquiry registry database 113 responds to queries from inquiry intercept engine 111. Inquiry intercept engine of 111 returns information to requesting inquiry intercept instances 109. Inquiry intercept engine 111 is also coupled to inquiry response database 115. Inquiry response database 115 contains responses to inquiries.

System 100 includes an inquiry registry administration system 117. Inquiry registry administration system 117 is a computer that allows an administrator to input inquiry records into, and work with inquiry records in, inquiry registry database 113. Inquiry registry the administration system 117 enables administrator to prioritize, edit, and otherwise administer inquiry records within inquiry registry database 113. Inquiry registry administration system also performs automated inquiry registry database administration functions.

Figure 2:
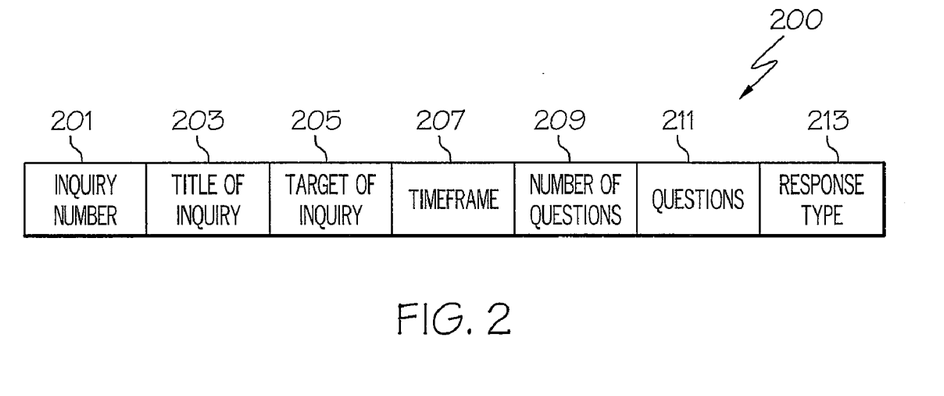
FIG. 2 is an illustration of an embodiment of an inquiry registry database record according to the present invention.

Referring now to FIG. 2, there is illustrated a form of an inquiry registry database record 200. Database record 200 includes an inquiry number 201 and the title of the inquiry 203. Inquiry number 201 is a number by which a particular inquiry is identified. Database record 200 includes the target of the inquiry 205. The target of the inquiry may be individual users, members of departments or groups within the organization, all members of the organization, all managers of the organization, or other groupings within the organization. Database record 200 includes a timeframe 207. The timeframe may be a "respond by date" or immediate. A timeframe 207 may also include an expiration date so that old inquiries may be deleted from the system. Database record 200 includes the number of questions 209 and the questions themselves 211. Finally, database record 200 includes the response type 213 for the questions. Examples of response type are multiple choice, choose one, choose many, freeform input, and the like.

Figure 3:
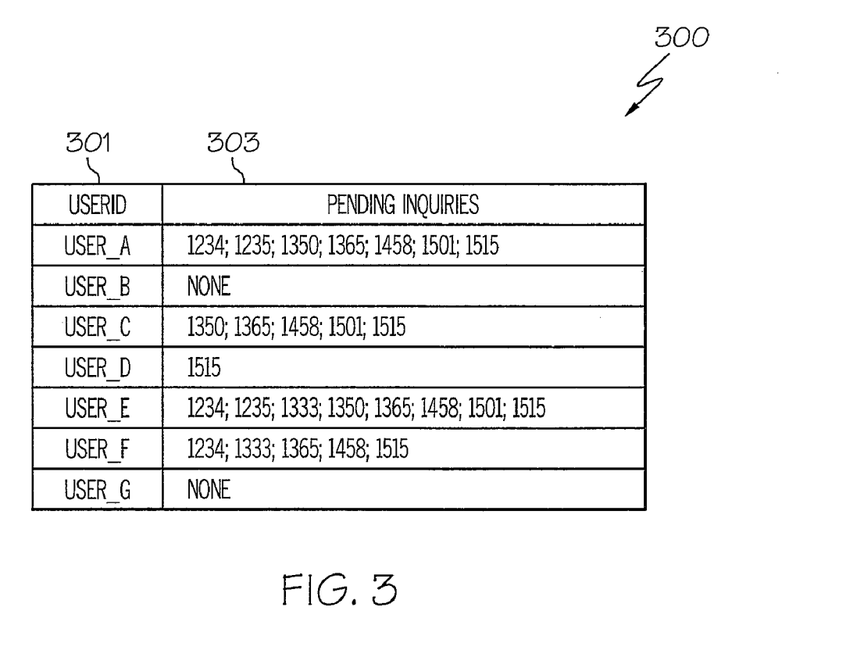
FIG. 3 is an illustration of an embodiment of an inquiry registry database index according to the present invention.

FIG. 3 illustrates a portion of an index 300 to the inquiry registry database. Index 300 includes a list of user IDs 301, which includes every member of the organization. Associated with each user ID of list 301 is a list of pending inquiries 303. List 303 is populated with the pending inquiries for each member of the organization. When inquiry registry administration 117 of FIG. 1 adds an inquiry record 200 to the inquiry registry database, inquiry registry administration assigns an inquiry number to the inquiry and uses target of inquiry information 205 to determine with which user IDs to associate the inquiry. In inquiry numbers within index 300 may be listed in order of priority.

Figure 4:
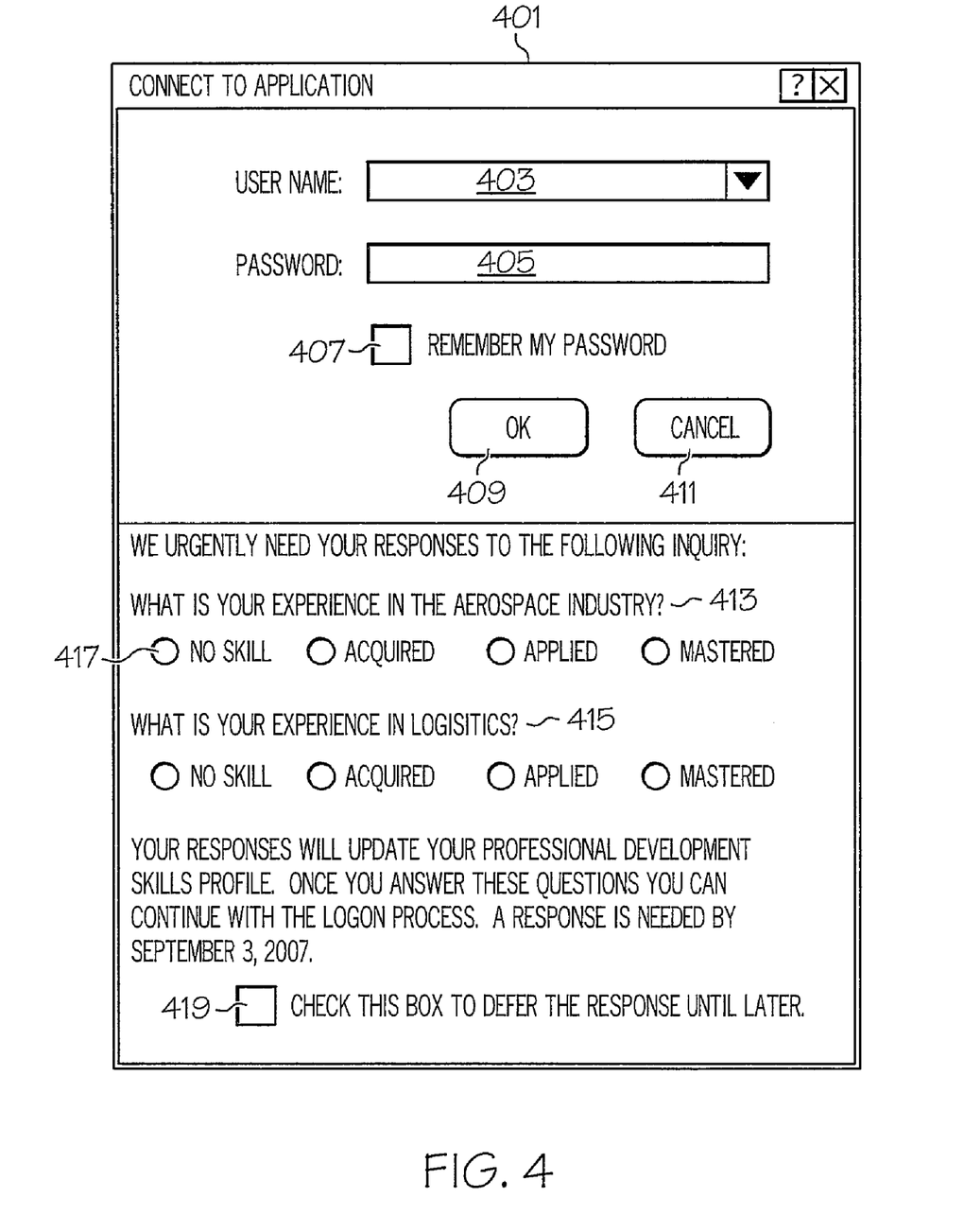
FIG. 4 is an illustration of an embodiment of a logon and inquiry dialog according to the present invention.

Referring now to FIG. 4, there is a pictorial representation of a logon and inquiry dialog box 401 according to the present invention. The top part is dialog box 401 is a typical logon dialog including a user name drop-down field 403 and a password field 405. The top part of dialog box 401 includes a "Remember my password" check box 407 as well as an OK button 409 and a cancel button 411. The bottom part of dialog box 401 includes an inquiry. An inquiry intercept instance 109 of FIG. 1 constructs the inquiry from the inquiry record information in FIG. 2. Two questions 413 and 415 are presented in dialog box 401. The answer choices are presented using radio button controls, such as radio button control 417. As is known to those skilled in the art, radio button controls allow a user to choose one answer. Dialog box 401 advises the user the purpose for which the questions will be used and that the user will be able to continue with the logon process after having answered the questions. In the embodiment of FIG. 4, dialog box 401 advises the user of the day by which a response is needed. In the embodiment of FIG. 4, dialog box 401 includes a checkbox 419 that enables the user to defer responding until later. If the user checks checkbox 419, the user can logon without responding.

Figure 5:
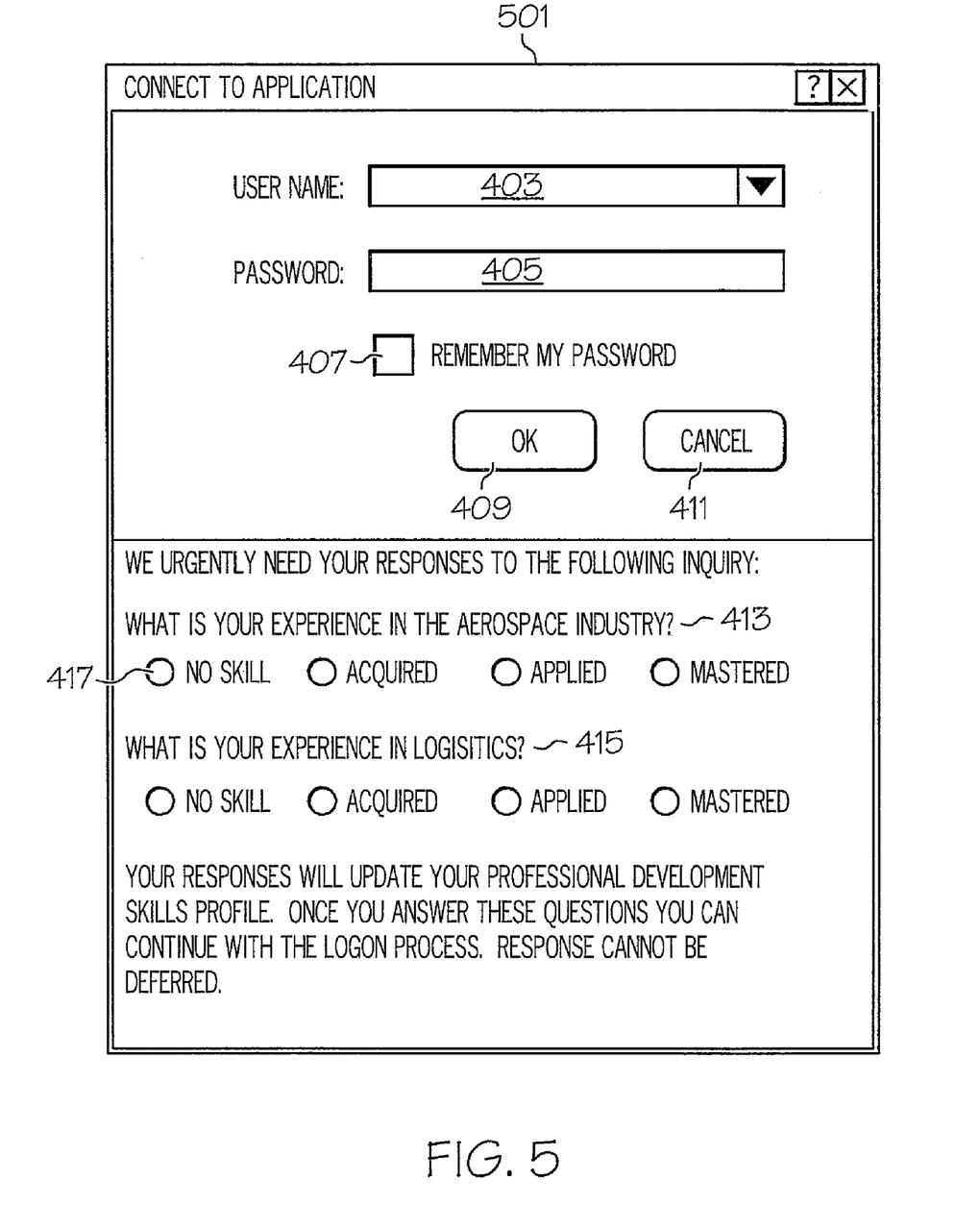
FIG. 5 is an illustration of a second embodiment of a logon and inquiry dialog according to the present invention.

FIG. 5 illustrates a second embodiment of a logon and inquiry dialog box 501. According to the present invention dialog box 501 is similar to dialog box 401. However, dialog box 501 does not permit the user to defer responding to the inquiry. The user will not be permitted to logon to the application without responding to the inquiry. Thus, the user will have to respond to the inquiry before being permitted to use the application.

Figure 6:
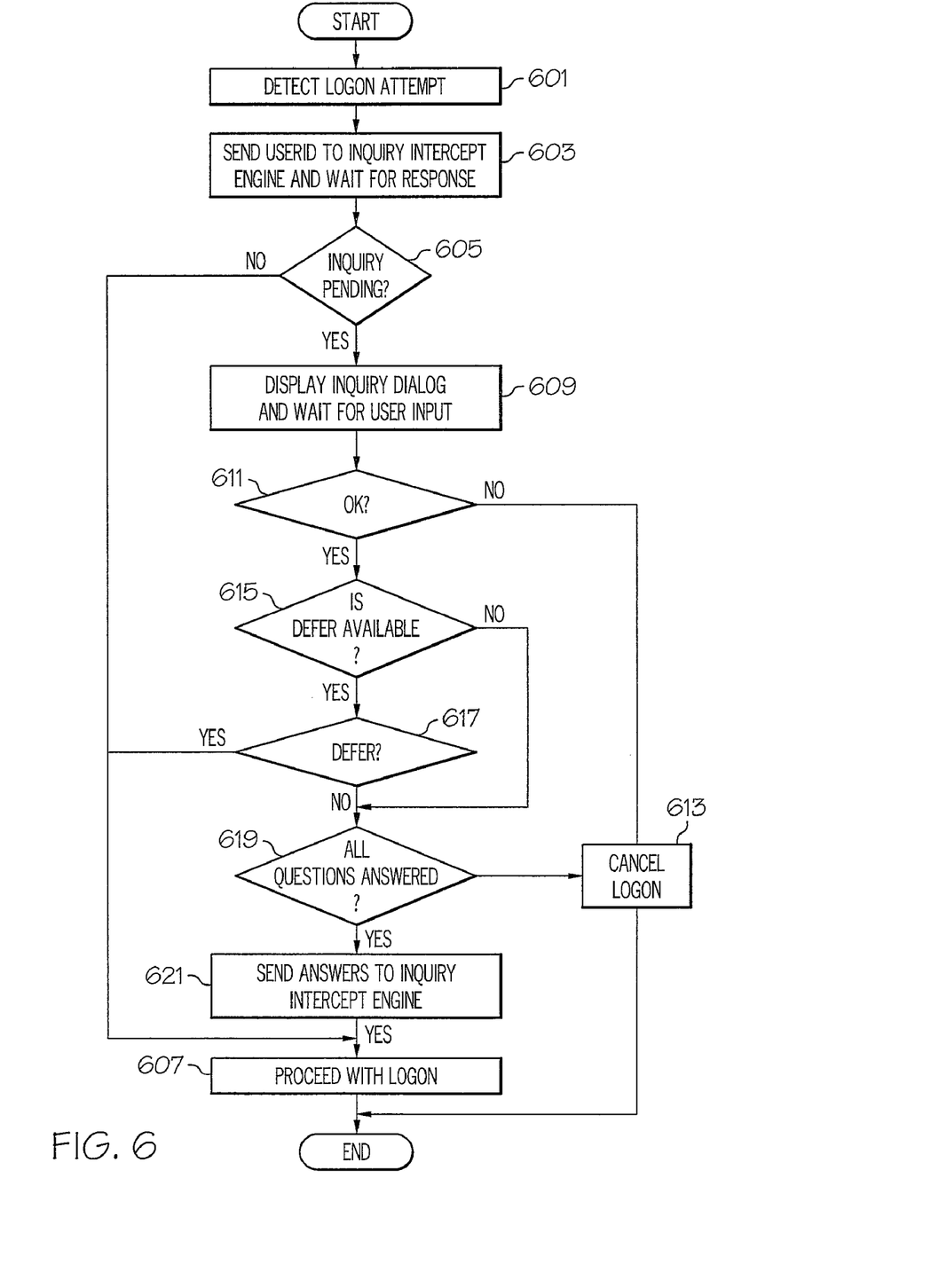
FIG. 6 is flow chart of an embodiment of inquiry intercept instance processing according to the present invention.

FIG. 6 is a flow chart of an embodiment of inquiry intercept instance processing according to the present invention. The inquiry intercept instance detects a logon attempt at block 601. The inquiry intercept instance sends to the inquiry intercept engine the user ID of the user attempting to logon and waits for a response at block 603. If, as determined at decision block 605, the inquiry intercept engine returns "no inquiry pending," the inquiry intercept instance allows the user to proceed with logon, as indicated at block 607. If, as determined at decision block 605, an inquiry is pending, the inquiry intercept instance builds and displays an inquiry dialog and waits for user input, as indicated at block 609. Inquiry intercept instance processing will continue when the user activates either OK button 409 or cancel button 411 of FIGS. 3 and 4. If, as determined at decision block 611, the user input is not OK, which implies that the user has selected cancel, the inquiry intercept instance cancels the logon attempt, as indicated at block 613, and processing ends. If the user has activated the OK button, then the inquiry intercept instance determines, at decision block 615, if "defer" is an available choice. If so, the inquiry intercept instance determines, at decision block 617, if the user has selected defer. If so, the inquiry intercept instance proceeds with logon, as indicated at block 607. If, as determined at decision block 615, defer is not available, or, as determined at decision block 617, the user has not chosen to defer responding, the inquiry intercept instance determines, at decision block 619, if the user has answered all of the questions. If not, the inquiry intercept instance cancels logon attempt, at block 613, and processing ends. If the user has answered all of the questions, then the inquiry intercept instance sends the answers to the inquiry to the inquiry intercept engine, at block 521, proceeds with logon, at block 607, and processing ends.

Figure 7:
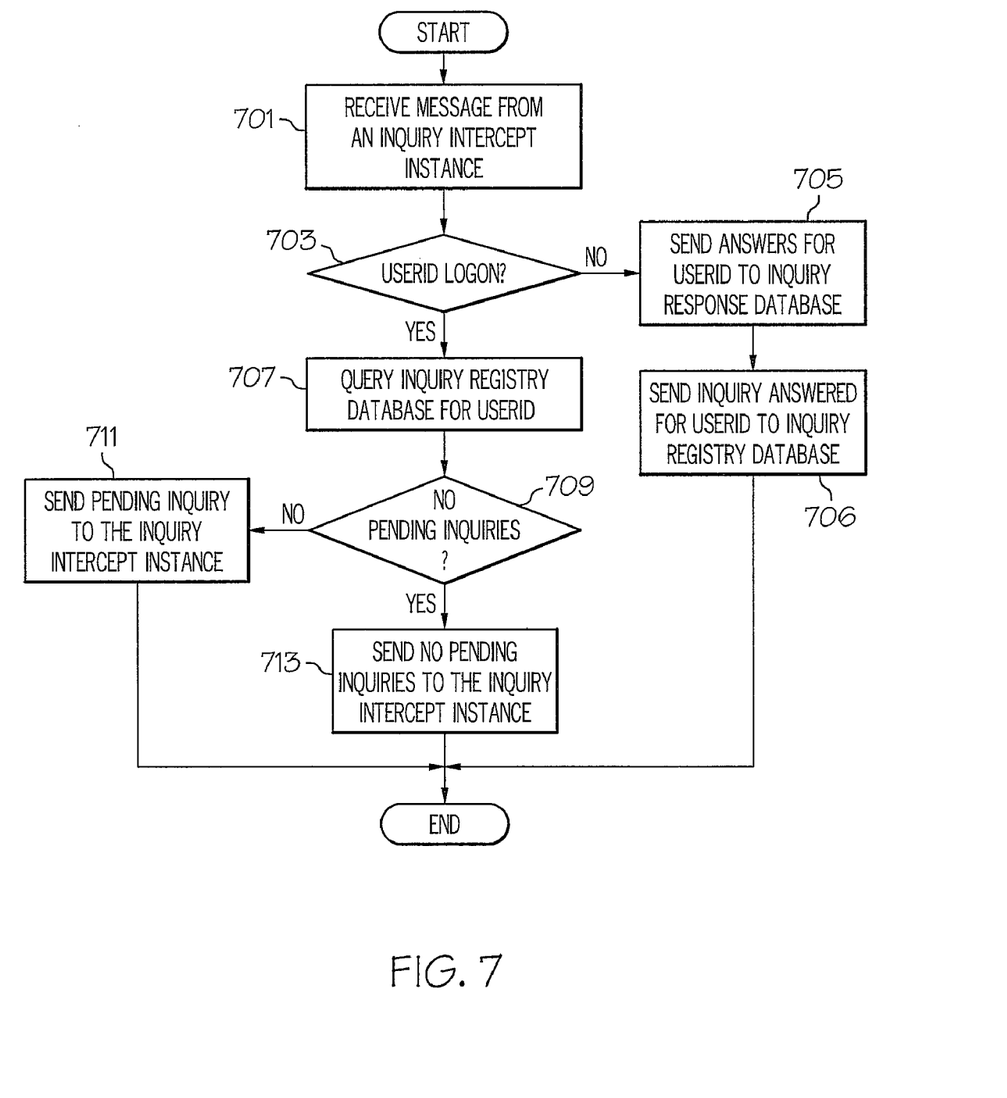
FIG. 7 is a flow chart of an embodiment of inquiry intercept engine processing according to the present invention.

FIG. 7 is a flow chart of an embodiment of inquiry intercept engine processing according to the present invention. The inquiry intercept engine receives a message from an inquiry intercept instance, at block 701. The inquiry intercept engine determines, at decision block 703, if the message received is a user ID logon. If not, which implies that answers have been received, the inquiry intercept engine sends the answers for the user ID to the inquiry registry database, as indicated at block 705, and sends an inquiry answered for user ID message to inquiry registry database, as indicated at block 706. If, as determined at decision block 703, the message is a user ID logon, the inquiry intercept engine queries the inquiry registry database for pending inquiries for the user, as indicated at block 707. If, as determined at decision block 709, the inquiry intercept engine receives a no pending inquiries message, the inquiry intercept engine sends a no pending inquiries message to the requesting inquiry intercept instance, at decision block 711, and processing ends. If there are pending inquiries, the inquiry intercept engine sends the pending inquiry received from the inquiry registry database to the requesting inquiry intercept instance, at block 713, and processing ends.

Figure 8:
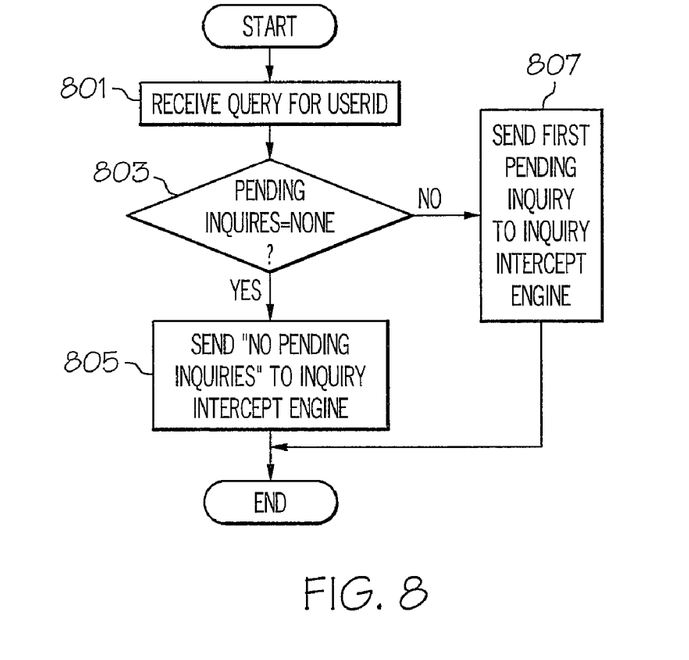
FIG. 8 is a flow chart of an embodiment of inquiry registry database query processing according to the present invention.

FIG. 8 is a flow chart of an embodiment of inquiry registry database query processing according to the present invention. The inquiry registry database receives a query for a user ID at block 801. The inquiry registry searches database the index of FIG. 3 for the user ID. If, as determined at decision block 803, the pending inquiries for the user ID is equal to NONE, the inquiry registry database sends a no pending inquiries message to the inquiry intercept engine, as indicated at block 805. If, as determined at decision block 803, pending inquiries is not equal to NONE, the inquiry registry database sends the first pending inquiry for the user ID to the inquiry intercept engine, as indicated at block 807, and processing ends.

Figure 9:
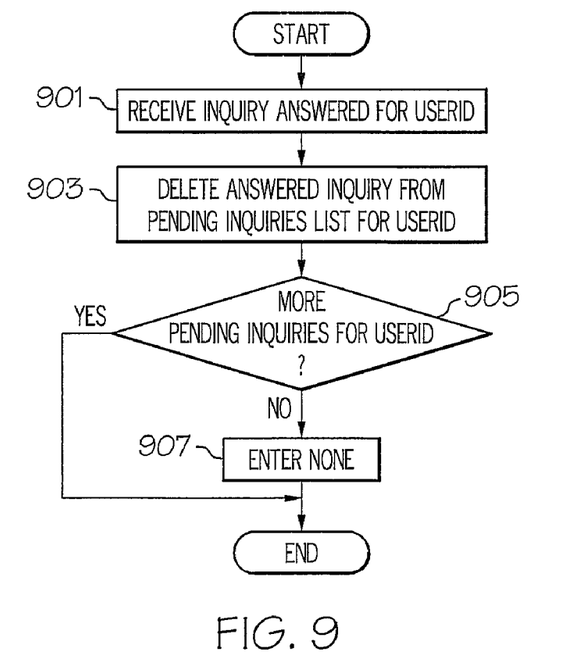
FIG. 9 is a flow chart of an embodiment of inquiry registry database inquiry answered processing according to the present invention.

FIG. 9 is a flow chart of an embodiment of inquiry registry database inquiry answered processing according to the present invention. The registry database receives an inquiry answered for user ID message, as indicated at block 901. The inquiry registry database deletes the answered inquiry number from the list of pending inquiries for the user ID, as indicated at block 903. Then, the inquiry registry database determines, at decision block 905, if there are more pending inquiries for the user ID. If not, the inquiry registry database inserts NONE, at block 907, and processing ends.

Figure 10:
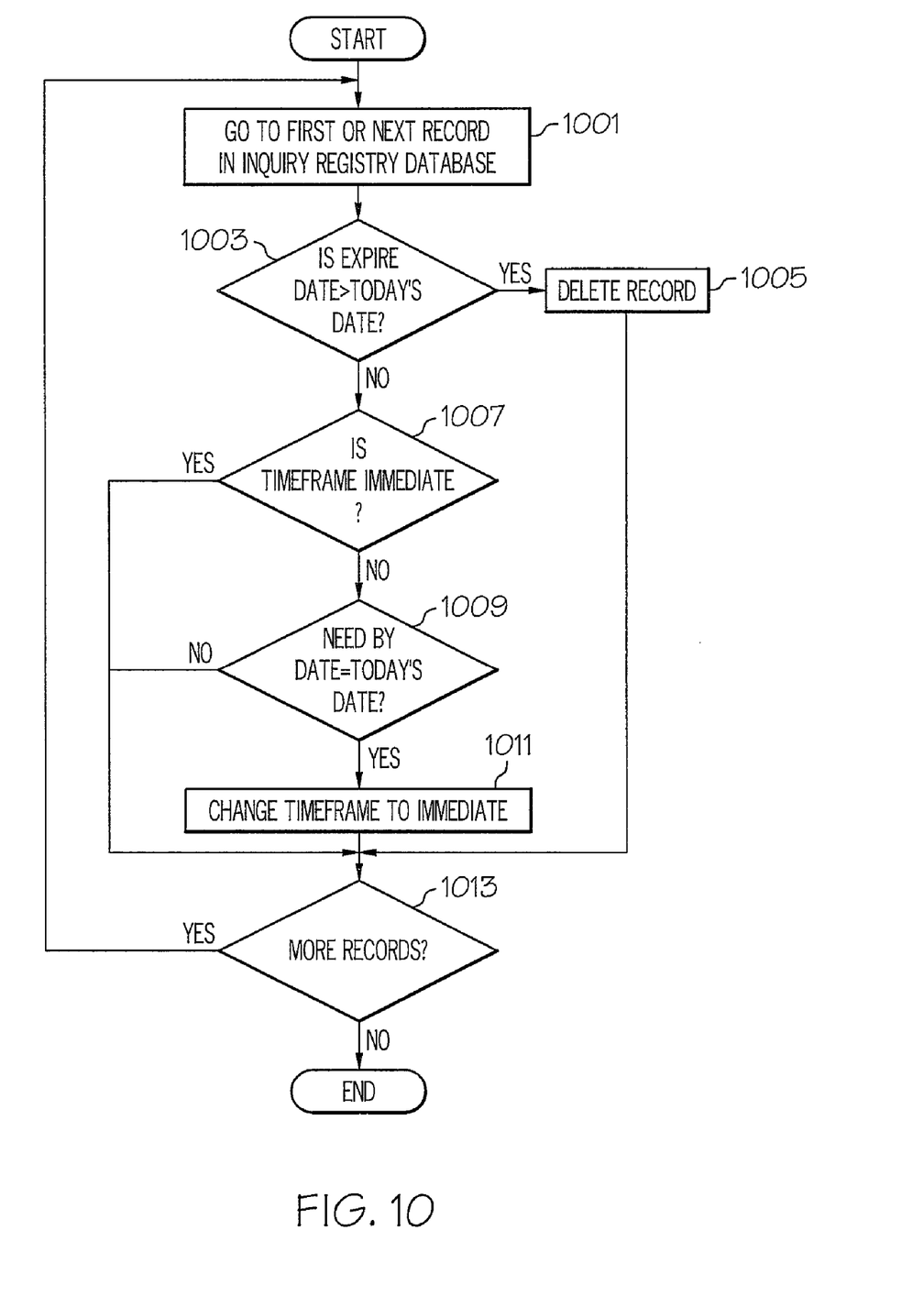
FIG. 10 is a flow chart of an embodiment of inquiry registry administration processing according to the present invention; and, FIG. 11 is a block diagram of an information handling system adapted to implement methods and systems according to the present invention.

FIG. 10 is a flow chart of an embodiment of automated inquiry registry administration processing according to the present invention. Automated inquiry registry administration processing may be performed once a day, preferably during periods of low system utilization so as not to negatively impact response times. The automated inquiry registry administration goes to the first or next record in the inquiry registry database, as indicated at block 1001. Then, inquiry registration administration determines, at decision block 1003, if the expire date of the record is greater than today's date. If so, the record is deleted, as indicated at block 1005. If the expiration date of the record is not greater than today's date, the inquiry registry administration determines, at decision block 1007, if the timeframe for the record is immediate. If not, inquiry registry administration determines, at decision block 1009, if the need by date of the record is equal to today's date. If so, inquiry registry administration changes the timeframe to immediate, at block 1011. Then, inquiry registry administration determines, at decision block 1013, if there are any more records. If so, processing returns to block 1001. If not, processing ends.

Figure 11:
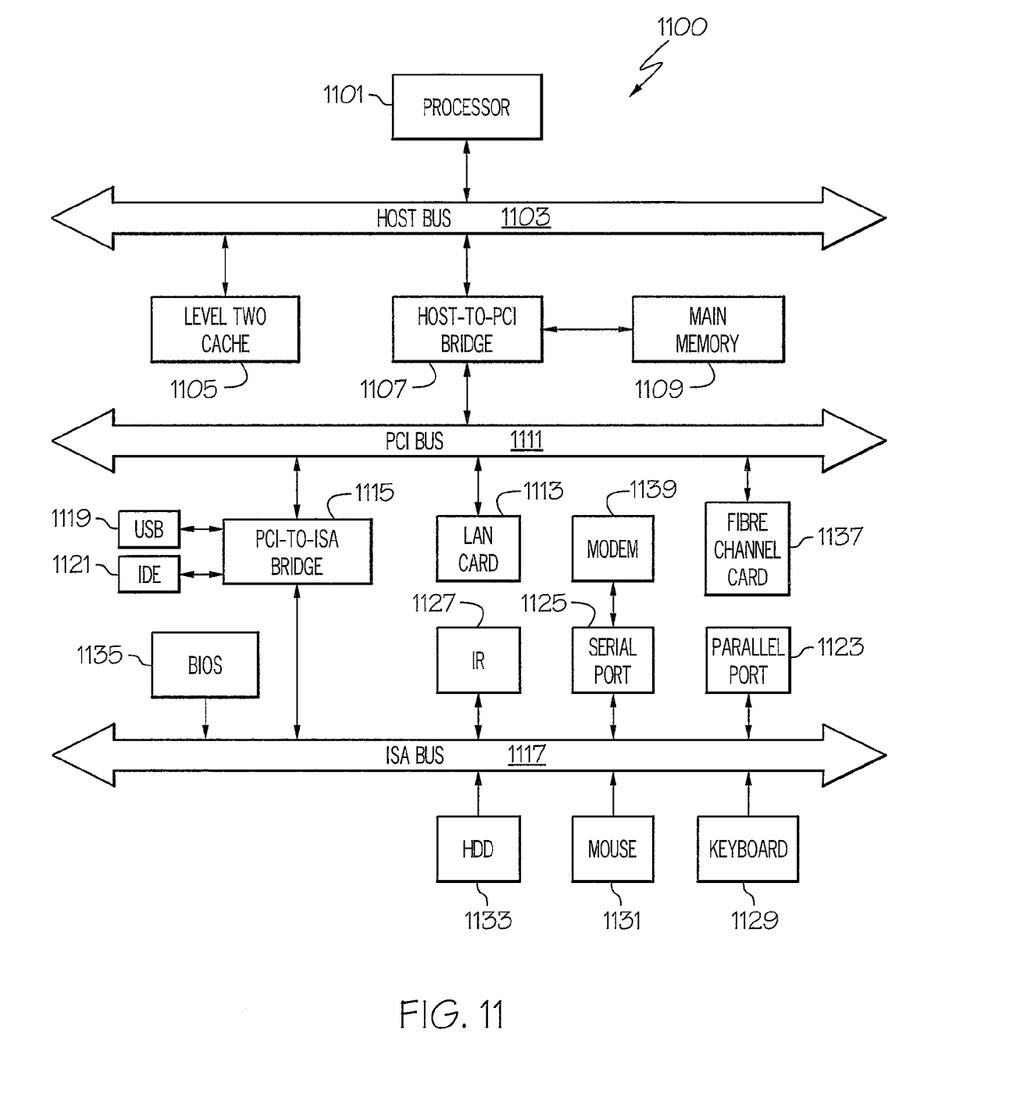

Referring now to FIG. 11, there is illustrated a block diagram of a generic information handling system 1100 capable of performing the server and client operations described herein. Computer system 1100 includes processor 1101 which is coupled to host bus 1103. Processor 1101 preferably includes an onboard cache memory. A level two (L2) cache memory 1105 is also coupled to host bus 1103. A Host-to-PCI bridge 1107 is coupled to host bus 1103. Host-to-PCI bridge 1107, which is coupled to main memory 1109, includes its own cache memory and main memory control functions. Host-to-PCI bridge 1107 provides bus control to handle transfers among a PCI bus 1111, processor 1101, L2 cache 1105, main memory 1109, and host bus 1103. PCI bus 1111 provides an interface for a variety of devices including, for example, a local area network (LAN) card 1113, a PCI-to-ISA bridge 1115, which provides bus control to handle transfers between PCI bus 1111 and an ISA bus 1117, a universal serial bus (USB) 1119, and an IDE device 1121. PCI-to-ISA bridge 1115 also includes onboard power management functionality. PCI-to-ISA bridge 1115 can include other functional elements not shown, such as a real-time clock (RTC), DMA control, interrupt support, and system management bus support.

Peripheral devices and input/output (I/O) devices can be attached to various interfaces or ports coupled to ISA bus 1117. Such interfaces or ports may include a parallel port 1123, a serial port 1125, an infrared (IR) interface 1127, a keyboard interface 1129, a mouse interface 1131, and a hard disk drive (HDD) 1133.

A BIOS 1135 is coupled to ISA bus 1117. BIOS 1135 incorporates the necessary processor executable code for a variety of low-level system functions and system boot functions. BIOS 1135 can be stored in any computer readable medium, including magnetic storage media, optical storage media, flash memory, random access memory, read only memory, and communications media conveying signals encoding the instructions (e.g., signals from a network). In order to couple computer system 1100 to another computer system to copy files or send and receive messages over a network, LAN card 1113 may be coupled to PCI bus 1111. Similarly, a Fibre Channel card may be coupled to PCI bus 1113. Additionally, a modem 1139 may be coupled to ISA bus 1117 through serial port 1125 to support dial-up connections.

While the computer system described in FIG. 8 is capable of executing the invention described herein, the illustrated system is simply one example of a computer system. Those skilled in the art will appreciate that many other computer system designs are capable of performing the invention described herein.

One of the preferred implementations of the invention is an application, namely, a set of instructions (program code) in a code module that may, for example, be in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of submitting inquiries to members of an organization, the method comprising:
    receiving a request from a member of an organization to logon to a server utilizing a login process that requires entry of at least a member ID;
    determining if there is a pending inquiry, which is an organizational level query, that has been pre-generated and pre-stored within an inquiry register database prior to the request to logon to the server and which is associated with a particular member ID of the member requesting access to logon to the server and which is scheduled to be automatically submitted to said member on receipt of the request from the member to logon to the server, after receipt of an entry of at least the member ID; and
    if there is a pending inquiry stored within the inquiry register database to be submitted to said member, displaying said pending inquiry to said member with selectable options for the user to respond to the pending inquiry via a separate inquiry intercept process that is provided along with the initial logon process.

2. The method as claimed in claim 1, further comprising:
    permitting said member to logon to said server if said member responds to said inquiry after said members enters a correct combination of member ID and associated password.

3. The method as claimed in claim 1, wherein the pending inquiry is one or more organizational level questions asked of one or more members of the organization who log into the server and which generates one or more responses from the members that are utilized by the organization to make business decisions.

4. The method as claimed in claim 1, further comprising:
    maintaining the inquiry registry database for said organization, said inquiry registry database including all inquiries for said organization;
    wherein said inquiry register database provides multiple database records, which each comprising one or more entries from among: an inquiry number for identifying the inquiry; a title of the inquiry; one or more targets of the inquiry; a timeframe for responding to the inquiry; a number of questions and the questions themselves; and a response type for the questions;
    wherein determining if there is a pending inquiry to be submitted to said member comprises querying said inquiry registry database; and
    wherein when the timeframe includes an expiration date, the method further comprises automatically deleting old inquiries from the inquiry register database.

5. The method as claimed in claim 1, wherein
    the pending inquiry comprises one of an employee satisfaction survey and a skills assessment.

6. The method as claimed in claim 4, further comprising:
    prioritizing said inquiries in said inquiry registry database; and
    displaying to said member a highest priority pending inquiry during said logon by the member to the server.

7. The method as claimed in claim 1, further comprising:
    maintaining an inquiry response database for said organization, wherein the inquiry response database is different from the inquiry registry database and receives and stores responses received from one or more members who provide a response to pending inquiries presented to the one or more members during one or more member logons to the server;
    wherein the inquiry response database includes.

8. A system for submitting inquiries to members of an organization, the system comprising:
    an inquiry registry database, said inquiry registry database including all inquiries for said organization including inquiries related to organizational level questions; and,
    an inquiry intercept instance residing on to a server coupled to said inquiry registry database, said inquiry intercept instance being configured, in response to an attempt by a member to logon to said server, to determine if said inquiry registry database includes an inquiry for said member, wherein said inquiry intercept instance performs the functions of:
        determining if there is a pending inquiry, which is an organizational level query that has been pre-generated and pre-stored within the inquiry register database and which is associated with a particular member ID of the member requesting access to logon to the server and which is to be automatically submitted to said member on receipt of the request from the member to logon to the server; and
        if there is a pending inquiry stored within the inquiry register database to be submitted to said member, displaying said pending inquiry to said member with selectable options for the user to respond to the pending inquiry, wherein said displaying occurs (a) after entering the member ID and other information required to access the server when no inquiry is pending and (b) before granting access to the server
    display an inquiry to said member in response to an attempt by said member to logon to said server;
    permit said member to logon to said server if said member answers said inquiry; and
    deny said member access to said server if said member fails to answer said inquiry.

9. The system as claimed in claim 8, wherein the pending inquiry is one or more organizational level questions asked of one or more members of the organization who log into the server and which generates one or more responses from the members that are utilized by the organization to make business decisions.

10. The system as claimed in claim 8, wherein the inquiry comprises one of an employee satisfaction survey and a skills assessment.

11. The system as claimed in claim 8, wherein the inquiry registry database provides multiple database records, which each comprising one or more entries from among: an inquiry number for identifying the inquiry; a title of the inquiry; one or more targets of the inquiry; a timeframe for responding to the inquiry; a number of questions and the questions themselves; and a response type for the questions;
    Wherein the determining if there is a pending inquiry to be submitted to said member comprises querying said inquiry registry database; and
    wherein when the timeframe includes an expiration date, the functions performed by the inquiry intercept instants further comprises the function of automatically deleting old inquiries from the inquiry register database.

12. The system as claimed in claim 8, further comprising:
    an inquiry intercept engine coupled between said server and said inquiry registry database, said inquiry intercept engine being configured to query said inquiry registry database in response to requests from said inquiry intercept instance; and an inquiry response database coupled to said inquiry intercept engine, said inquiry response database including responses to inquiries;

wherein the inquiry response database is different from the inquiry registry database and receives and stores responses received from one or more members who provide a response to ending inquiries presented to the one or more members during one or more member logons to the server; and wherein the system further provides the functionality of:
prioritizing said inquiries in said inquiry registry database; and,
displaying to said member a highest priority pending inquiry.

13. An article of manufacture for implementing a method of submitting inquiries to members of an organization, which comprises:
a computer readable storage medium having computer readable code thereon, said compute readable code comprising:
instructions for detecting an attempt by a member to logon to a server;
instructions for determining if there is a pending inquiry, which is an organizational level query, that has been pre-generated and pre-stored within an inquiry register database prior to the request to logon to the server and which is associated with a particular member ID of the member requesting access to logon to the server and which is scheduled to be automatically submitted to said member on receipt of the request from the member to logon to the server, after receipt of an entry of at least the member ID; and
instructions for displaying said pending inquiry to said member with selectable options for the user to respond to the pending inquiry, if there is a pending inquiry stored within the inquiry register database to be submitted to said member
instructions for permitting said member to logon to said server if said member responds to said inquiry; and
instructions for denying access to said server if said member fails to respond to said inquiry.

14. The article of manufacture as claimed in claim 13, wherein said computer readable code further comprises:
instructions for maintaining the inquiry registry database for said organization, said inquiry registry database including all inquiries for said organization;
wherein said inquiry register database provides multiple database records, which each comprise one or more entries from among: an inquiry number for identifying the inquiry; a title of the inquiry; one or more targets of the inquiry; a timeframe for responding to the inquiry; a number of questions and the questions themselves; and a response type for the questions;
wherein determining if there is a pending inquiry to be submitted to said member comprises querying said inquiry registry database;
wherein when the timeframe includes an expiration date, the instructions further comprises instructions for automatically deleting old inquiries from the inquiry register database;
instructions for prioritizing said inquiries in said inquiry registry database; and instructions for displaying to said member a highest priority pending inquiry.

15. The article of manufacture as claimed in claim 13, wherein said computer readable code further comprises:
instructions for permitting said member to defer responding to said inquiry;
instructions for maintaining an inquiry response database coupled to an inquiry intercept engine, said inquiry response database storing responses received to inquiries;
wherein the inquiry response database is different from the inquiry registry database and receives and stores responses received from one or more members who provide a response to pending inquiries presented to the one or more members during one or more member logons to the server.

16. The system of claim 8, further comprising:
an inquiry registry administration system, which allows an administrator to input inquiry records into, and work with inquiry records in, the inquiry registry database and which enables the administrator to prioritize, edit, and otherwise administer inquiry records within inquiry registry database, and which performs automated inquiry registry database administration functions.

17. A method of submitting inquiries to members of an organization, the method comprising:
receiving a request from a member of an organization to logon to a server utilizing a login process that requires entry of at least a member ID;
determining if there is a pending inquiry, which is an organizational level query, that has been pre-generated and pre-stored within an inquiry register database prior to the request to logon to the server and which is associated with a particular member ID of the member requesting access to logon to the server and which is scheduled to be automatically submitted to said member on receipt of the request from the member to logon to the server, after receipt of an entry of at least the member ID, and which is associated with a due date;
if there is a pending inquiry stored within the inquiry register database to be submitted to said member, displaying said pending inquiry to said member with selectable options for the user to respond to the pending inquiry via a separate inquiry intercept process that is provided along with the initial login process;
determining if the current date is earlier than the due date of said pending inquiry;
if said current date is earlier, then:
displaying a defer control;
permitting said member to defer responding to said inquiry;
re-scheduling the inquiry for submission to the member during a subsequent login by the member;
permitting said member to logon if said members defers responding to said inquiry and provides a correct combination of member ID and other credentials required to access the server;
if said current date is not earlier, then:
denying access to said server if said member fails to respond to said inquiry regardless of whether said member enters a correct combination of member ID and associated password.

* * * * *